United States Patent

Kikuchi

[15] 3,643,069

[45] Feb. 15, 1972

[54] RECOGNITION APPARATUS WITH READOUT MODE SELECTION CAPABILITY

[72] Inventor: Yoshiyasu Kikuchi, Tokyo-to, Japan

[73] Assignee: Nippon Electric Company, Limited, Tokyo, Japan

[22] Filed: Sept. 29, 1969

[21] Appl. No.: 861,818

[30] Foreign Application Priority Data

Sept. 30, 1968 Japan ....................43/71621

[52] U.S. Cl. ....................235/61.11 E, 340/146.3 Z

[51] Int. Cl. ....................G06k 7/00

[58] Field of Search ....................235/61.12, 61.114, 61.115, 235/61.7 B; 340/146.3

[56] References Cited

UNITED STATES PATENTS

| | | | |
|---|---|---|---|
| 3,426,324 | 2/1969 | Manly | 340/146.3 B |
| 3,444,517 | 5/1969 | Rabinow | 340/146.3 B |
| 3,033,449 | 5/1962 | Quinn et al. | 235/61.11 |
| 3,389,241 | 6/1968 | Harvey | 235/61.11 |

OTHER PUBLICATIONS

Chesarek et al. IBM Technical Disclosure Bulletin, "Magnetic Tape Coding," Vol. 9, No. 6, Nov. 1966. pp. 572 235/61.114

*Primary Examiner*—Maynard R. Wilbur
*Assistant Examiner*—Leo H. Boudreau
*Attorney*—Marn & Jangarathis

[57] ABSTRACT

Recognition apparatus for reading mark-sensed documents having widely variable formats and various types of information thereon is provided by the present invention. The recognition apparatus according to the present invention comprises a plurality of transducer means adapted to sense marks present on a document, means for causing the document to move relative to the plurality of transducer means and means responsive to outputs of a predetermined number of the plurality of transducer means for selectively encoding outputs of the others of the plurality of transducers so that the marks on the document may be separately and selectively encoded in accordance with their nature whereby the document is read as a function of certain of the marks thereon and not the document format.

5 Claims, 5 Drawing Figures

INVENTOR.
Yoshiyasu Kikuchi
BY
Marn & Jangarathis
ATTORNEYS

INVENTOR.
Yoshiyasu Kikuchi
BY
Marn & Jangarathis
ATTORNEYS

| | A | K | S | T | N | H | M | Y | R | W |
|---|---|---|---|---|---|---|---|---|---|---|
| a | ア | カ | サ | タ | ナ | ハ | マ | ヤ | ラ | ワ |
| i | イ | キ | シ | チ | ニ | ヒ | ミ | | リ | |
| u | ウ | ク | ス | ツ | ヌ | フ | ム | ユ | ル | |
| e | エ | ケ | セ | テ | ネ | ヘ | メ | | レ | |
| o | オ | コ | ソ | ト | ノ | ホ | モ | ヨ | ロ | |

Fig. 4.

INVENTOR
Yoshiyasu Kikuchi
BY Marn & Jangarathis
ATTORNEYS

INVENTOR
Yoshiyasu Kikuchi
BY
Marn & Jangarathis
ATTORNEYS

RECOGNITION APPARATUS WITH READOUT MODE SELECTION CAPABILITY

This invention relates to mark recognition apparatus and more particularly to mark-sensed document recognition apparatus capable of selecting one suitable mode from several possible modes of reading handwritten or printed marks on a suitably arranged document format in response to binary coded readout parameters present on such document.

In the electronic data-processing arts, market sensed data cards or sheets which comprise data cards or similar documents having selectively penciled line or bar marks entered in appropriately placed mark positions printed thereon have been recognized as highly advantageous means for the input of certain types of data when compared to perforated cards or tapes. The chief attribute of such mark-sensed data cards or sheets is that they may be simply prepared with a suitable pencil and hence the preparer requires no special training or specialized apparatus therefor. Thus, where the data to be collected represents test answers for machine scoring, survey information, or an applicant's answers to standardized questions; mark-sensed documents have no equal when ease of preparation is considered.

However, as conventional reading or recognition apparatus for such mark-sensed documents are strictly designed to accept and faithfully read out only documents conforming to a prescribed format, mark recognition systems as a whole have been highly inflexible and thus rather limited in use. For instance, if the rows and columns of a conventional data card are considered, it will be immediately appreciated that only predetermined types of marks arranged in a prescribed format may be used thereon. Therefore, one seeking to utilize such mark-sensed data cards must strictly conform to the prescribed format required and is thereby confined to the narrow range of flexibility dictated by conventional mark recognition systems. This narrow range of flexibility renders the entry of information on such mark-sensed data cards difficult because the rows and columns of the matrix present in the prescribed format of the data card offers only a limited space for the entry of preselected forms of data and thus if the user is interested in only a particular type of information many data cards are required as only small amounts of information can be entered on each card. Furthermore, information entered on documents under these conditions not only takes substantial amounts of time to enter but the processing thereof is also time consuming and difficult. Accordingly, so long as the recognition apparatus relied upon to recover information initially stored on mark-sensed documents can only read out information stored on documents having a prescribed format, the use of such mark-sensed documents will be highly restricted because, unless a specific format of a given document meets the requirements for the intended utilization thereof or the use contemplated is sufficient to warrant specifically designed mark-sensed document recognition apparatus therefor; the high expense, low storage density and processing problems which attend the use of mark-sensed documents under these conditions will prohibit their use despite the convenience thereof.

Therefore, it is an object of this invention to provide mark recognition apparatus for mark-sensed documents having a variable format.

It is a further object of this invention to provide mark recognition apparatus for documents in the form of freely designed data cards or sheets from which information signals may be derived as an output despite the entry of information thereon in various forms.

It is an additional object of this invention to provide mark recognition apparatus for mark-sensed documents capable of selecting one of several possible modes for reading the information recorded thereon.

It is another object of this invention to provide mark recognition apparatus for mark-sensed documents responsive to binary coded readout parameters present on such document to select an appropriate one of several possible modes of reading marks present on portions of said document or sheets.

Other objects of the present invention will become apparent from the detailed description of an exemplary embodiment thereof which follows and the novel features of the present invention will be particularly pointed out in conjunction with the claims appended hereto.

Although the term mark-sensed document will be used hereinafter to describe the instrument upon which marks representative of information is handwritten or printed, it will be appreciated by those of ordinary skill in the art that any form of instrument such as a data card or sheet upon which marks may be placed in a desired format is intended to be encompassed thereby. Thus, it will be understood that whenever the term mark-sensed document is used, data cards, sheets or other conventional types of instruments adapted to have information hand recorded or printed thereon may be used and that the term document is intended to include all such instruments.

The present invention proceeds upon the principle that predetermined binary coded parameters may be placed on appropriate portions of a mark-sensed document and that the mark recognition apparatus according to the present invention may be made responsive thereto so that a plurality of mark positions associated with each binary coded parameter may be read out according to one of several modes which is appropriate therefor. Thus, if a first example is considered the mark-sensed document may have numerical information and/or character information present thereon as well as binary coded parameters associated therewith and the mark recognition apparatus according to the present invention is responsive to such binary coded parameters to correctly select a reading mode for the numerical information and/or character information so that the information present in selected portions of such mark-sensed document is properly read out. In reading numerical information, entry of a mark in only one mark position per row in each of a restricted number of zones dividing the format of the mark-sensed document, as designated by the binary coded parameters present on the mark-sensed document, is read by the recognition apparatus according to the present invention as a "correct" entry while an entry of two or more marks per row in any of such zones is processed by the recognition apparatus according to the present invention as an "incorrect" entry. In reading character information, both the entry of one mark per row in each of certain designated zones and one mark per row in each of certain other designated rows, i.e., two marks per character, is processed as a "correct" entry and failure to meet these conditions is processed as an "incorrect" entry. In addition, "yes-no" or "true-false" information may be included as an alternative and under these conditions, again in response to detection by the recognition apparatus according to this invention of selected binary coded parameters associated therewith, the presence or absence of a mark in each of a prescribed number of mark positions is read out and processed.

If a second example is considered, a mark-sensed document may be utilized whose format is highly arbitrary and enables new zones to be set up by suitably combining, and using appropriate binary coded parameters to indicate the nature of the marks used, and mark positions corresponding to different columns in a matrix of mark positions for numerical information, character information and yes-no information. In addition, when desired, one or more zones in the format of the mark-sensed document may be reserved for the entry of other than mark-sensed information such as handwritten characters connoting identifying information such as a name, an address, notes or questions which serve as a reference when the data card is used and/or marks are to be entered in other zones. It should, however, be clearly understood that such handwritten characters can not be read out and hence do not serve in the role occupied by the mark information.

In a third example, the length or bit arrangement of information read out from mark-sensed documents, which are in the form of the so-called "word," "character" and "byte" representative of the mark information entered on the document and associated with selected binary coded readout parameters therefor may be changed at the output of the mark-reading apparatus according to the present invention in response to the detection of such binary coded readout parameters. This mode of operation is also directed to the improvement of the manner in which data stored on mark-sensed documents is read out and processed.

The above-stated, exemplary reading modes of the recognition apparatus according to the present invention enables a wide range of selectively variable mark-sensed documents to be utilized and the information thereon suitably read out and combined in response to the binary coded parameters present thereon. This aspect of the instant invention will contribute greatly to the rapid expansion of the use of mark-sensed documents because while the attribute of ease of preparation is maintained the flexibility and ambit of application thereof are substantially increased.

In accordance with the present invention mark and character recognition apparatus is provided comprising a plurality of transducer means adapted to sense marks and characters present on a document, means for causing said document to move relative to said plurality of transducer means and means responsive to outputs of a predetermined number of said plurality of transducer means for selectively encoding outputs of the other of said plurality of transducers so that said marks and characters may be separately and selectively encoded in accordance with their nature and produced by said mark and character recognition apparatus in a time division manner. The invention will be more clearly understood by reference to the following detailed description of an exemplary embodiment thereof in conjunction with the accompanying drawings, in which:

FIG. 4 shows an exemplary matrix of "kana" letters with which the present invention may be utilized.

Figure 1:
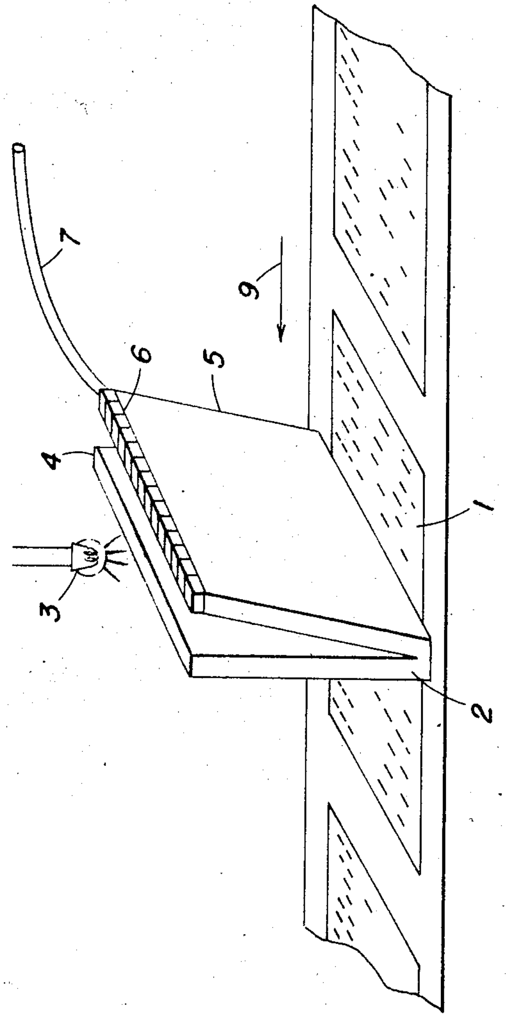
FIG. 1 shows the transducing portion of the recognition apparatus according to the present invention.

Referring now to the drawings and more particularly to FIG. 1 thereof, there is shown the transducing portion of the recognition apparatus according to the present invention in an operative relationship with a mark-sensed document 1. Although any form of mark transducing means may be relied upon in the present invention to transduce the information on the marked sensed document 1 into electrical signals, the transducing portion of the recognition apparatus according to the present invention illustrated in FIG. 1 has been shown as an optical system so as not to be limited in any way by the nature of the marks present on the mark-sensed document to be read. Accordingly, the transducing portion of the recognition apparatus of the present invention, as illustrated in FIG. 1 comprises an optical head 2, a light source 3 and output cable means 7. The optical head 2 is of the same width or slightly larger than the width of the mark-sensed document 1 to be read so that every mark position in a row of such mark-sensed document may be irradiated and sensed simultaneously. The optical head 2 comprises a first fiber optic portion 4 adapted to receive radiation from the light source 3 and simultaneously irradiate each mark position in a row of the mark-sensed document to be read and a second fiber optic portion 5 adapted to receive and convey a light intensity modulated signal, in the form of radiation reflected from the marked and unmarked portions of the row of the mark-sensed document 1 being irradiated. The first and second fiber optic portions 4 and 5 of the optical head 2 may take the form of wide continuous fiber optic bundles structured in the conventional manner; however, if in the second fiber optic portion 5, crosstalk between adjacent bits should become a problem, individual spaced fiber optic bundles may be used wherein each such individual fiber optic bundle is positioned over a mark position and spaced from the fiber optic bundles adjacent thereto. The second fiber optic portion 5 has affixed thereto a plurality of photoelectric transducer means 6 which may each be conventional devices such as photocells and act in the well-known manner to transduce modulated radiation received thereby into electrical signals representative of such modulated radiation. The plurality of photoelectric transducer means 6 are appropriately spaced along the second fiber optic portion 5 of the optic head 2 so that each photoelectric transducer means in the plurality receives only radiation reflected from one of the mark positions in the row of mark positions being irradiated on the mark-sensed document 1 and there are a sufficient number of photoelectric transducer means 6 in the plurality so that each mark position in a row is read out. The electrical outputs of each of the plurality of photoelectric transducer means 6 are connected to individual conductors within the output cable means 7. In addition, means are provided to cause each of the mark-sensed documents to pass beneath the optical head 2 at a uniform speed in the direction on of the arrow 9. This means may take the form of the belt drive indicated in FIG. 1 or any other conventional form of conveyor means. Alternately, as will be obvious to those of ordinary skill in the art, the optical head 2 may be caused to scan the mark-sensed documents to be read.

In the operation of the transducer portion of the recognition apparatus according to the present invention, each mark-sensed document 1 will be caused to move beneath the optical head 2 at a uniform speed in a direction indicated by the arrow 9. As each mark-sensed document 1 moves beneath the optical head 2 each row is sequentially illuminated by radiation emanating from the light source 3 and communicated to the portion of the surface of the mark-sensed document occupied by such row by the first fiber optic portion 4 of the optical head 2. The light rays which impinge upon the portion of the surface of the mark-sensed document occupied by a row is luminance modulated due to the presence or absence of marks at each mark position of the row passing beneath the optical head 2 in the well-known manner. Accordingly, the radiation reflected from each mark position of a row being irradiated comprises a light intensity modulated signal indicative of the presence or absence of a mark at that mark position.

As a portion of the radiation reflected from each mark position of a row being irradiated will impinge upon an associated area of the second fiber optic portion 5 of the optical head 2 adjacent thereto, such portion of the reflected radiation will be communicated through the second fiber optic portion 5 to the requisite one of the plurality of photoelectric transducer means 6 associated with each mark position in a row of the mark-sensed document 1. Thus, each of the plurality of photoelectric transducer means 6 receives a light intensity modulated signal indicative of the presence or absence of a mark at one mark position in a row, each mark position in a row is sensed simultaneously and each row on the mark-sensed document 1 is read sequentially as it passes beneath the optical head 2 in the direction of the arrow 9. Each of the plurality of photoelectric transducer means 6 transduces the light intensity modulated signals applied thereto into electrical signals representative thereof in the well-known manner and applies the electrical signal produced thereby to the conductor present in the output cable means 7 connected to its output. The output cable means 7 thus has a plurality of signals applied thereto which each represent the presence or absence or a mark in a given mark position of a row on the mark-sensed document being read and the total number of signals applied in parallel to the output cable means 7 are representative of the marked or unmarked condition of each mark present in a row of the mark-sensed document 1. The manner in which the signals applied to the output cable means 7 are utilized in the recognition apparatus according to the present invention is set forth in detail below in conjunction with FIG. 3; however, prior to the explanation of FIG. 3, the character of mark-sensed documents usable in the instant invention will be further considered.

Figure 2:
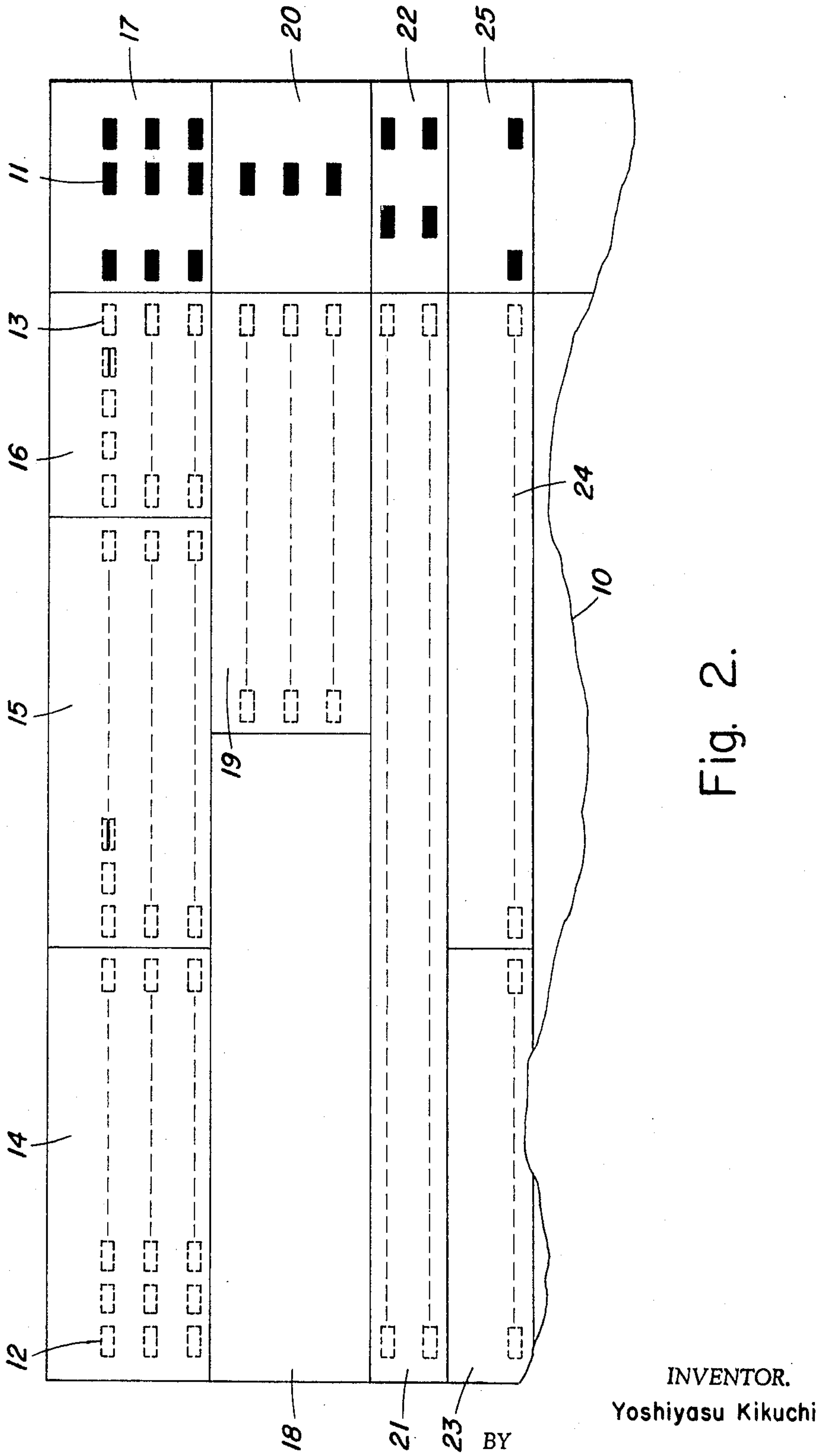
FIG. 2 shows an exemplary portion of a mark-sensed document suitable for use in the recognition apparatus according to the present invention.

FIG. 2 shows an exemplary portion of a mark-sensed document 10 suitable for use in the recognition apparatus according to the present invention. More particularly the mark-sensed document 10 illustrated in FIG. 2 is adapted to show the variable formats of mark-sensed documents which the recognition apparatus of the present invention will accept and faithfully read out. Accordingly, in FIG. 2, various types of information have been represented on the mark-sensed document 10 to demonstrate the flexibility of the recognition apparatus according to the present invention and the ease with which the format of a mark-sensed document 10 may be adapted for a particular purpose. However, as shall be apparent to those of ordinary skill in the art, the types of information shown on the mark-sensed document 10 of FIG. 2 as well as the format thereof is merely exemplary and thus, a given mark-sensed document for use with the present invention may include either less or more types of information than are shown in FIG. 2, more or less information of a particular type than is shown in FIG. 2 and the format of such given mark-sensed document may be readily changed to suit a particular purpose. In the mark-sensed document 10 shown in FIG. 2, the rows and columns of the matrix of mark positions present thereon have been divided into a plurality of zones 14–25 as indicated by the rectangular blocks dividing the mark-sensed document 10. Each of the zones 14–16, 18, 19, 21, 23 and 24 are adapted to receive mark information of a different type while zones 17, 20, 22 and 25, along the four rightmost mark position columns of the mark-sensed document 10, are adapted to receive binary coded parameters indicative of the type of information contained in the zone or zones adjacent thereto. More specifically, as the mark-sensed document 10 shown in FIG. 2 will have each mark position of a row read out simultaneously by the optical head 2 shown in FIG. 1, the rightmost four mark positions of each row receive binary coded parameters serving to identify the type or types of information contained in the remainder of the mark positions of that row. These binary coded parameters are used by the recognition apparatus according to the present invention, in a manner described below in conjunction with FIG. 3, to control the enclosing process to which the electrical signals derived from the remainder of the marks present in a row are subjected. Thus, the binary coded parameters present in zone 17 control on a rowwise basis the manner in which signals derived from zones 14–16 are processed, the binary coded parameters present in zone 20 control on a rowwise basis the manner in which signals derived from zones 18 and 19 are processed, the binary coded parameters present in zone 22 control on a rowwise basis the manner in which signals derived from zone 21 are processed and the binary coded parameters present in zone 25 control on a rowwise basis the manner in which signals derived from zones 23 and 24 are processed.

The zones 17, 20, 22 and 25 each are four columns wide and hence the binary coded parameters placed therein for each row take the form of four mark positions wherein the combination of marks and spaces printed or handwritten therein constitute a binary code. Thus, if the top row of the mark-sensed document 10 depicted in FIG. 2 is considered, as present within zones 14–17, it will be appreciated that mark positions 12–13 comprise information representing marks while marks 11 constitute a four mark position binary code indicative of the nature of the information stored in mark positions 12–13 and the manner in which they are to be encoded.

In the mark-sensed document 10 illustrated in FIG. 2, zone 14 is adapted to have numerical information entered therein. Accordingly, each row within zone 14 includes 10 mark positions representative of the digits "0" through "9" and a mark entered in one of the 10 mark positions within each row of the rows present within zone 14 represents one digit. Zones 15 and 16 illustrated in FIG. 2 are for the entry of information representing Japanese "kana" letters or other alphabets. Each row of the zones 15 and 16 are adapted to receive one mark each and the two-mark combination derived from the same row of zones 15 and 16 define the "kana" letter recorded. This may be clearly appreciated when it is considered that Japanese "kand" letters are composed of 50 different letters that can be arranged in a 5 by 10 matrix having 10 columns and five rows as illustrated in FIG. 4, wherein each "kana" letter may be presented phonetically by a combination of a consonant and a vowel in terms of the English alphabet. Therefore, as the column designation of a "kana" letter may be indicated by one of 10 mark positions in each row of zone 15 while the row designation of a "kana" letter may be indicated by one of five mark positions in each row of zone 16, appropriate "kana" letter information may be recorded on the mark-sensed document 10 by a combination of one mark placed in a row of zone 15 and a second mark placed in a corresponding row of zone 16. For example, should it be desired to enter the "kana" letter located at the cross point of the third column (S) and fourth row (e) on the mark sensed document 10, it is only necessary to mark a third mark position in a row of zone 15 and a fourth mark position in a corresponding row of zone 16. This technique however may be clearly extended to any alphabet. The zone 17 is adapted to receive binary coded parameters indicative of the type of information stored in zones 14–16 to thereby control the encoding of the electrical signals derived therefrom. As shown in FIG. 2, the binary code utilized in zone 17 for the types of information present in zones 14–16 is a three-mark, one-space binary code wherein the binary coded parameter 11 controls the manner in which marks 12–13 of the top row of the mark-sensed document 10 is read and subsequent binary coded parameters in zone 17 control the manner in which subsequent corresponding rows in zones 14–16 are read out.

Zone 18 on the mark-sensed document 10 is for the entry of any desired information such as notes or other handwritten or printed information. The information present in zone 18 does not constitute mark information and hence will not have any significance when portions thereof are read by the optical head 2 shown in FIG. 1. Accordingly, as this information is to have utility for only visual inspection by a viewer thereof, any signals produced therefrom by the optical head 2 must not be further processed by the recognition apparatus according to the present invention. Thus binary coded parameters controlling the disposition of information derived from zone 18 must ensure that any such information is deleted from the output of the recognition apparatus of the present invention. Zone 19 is adapted to receive numerical information of the same variety as was specified above in connection with the description of zone 14. Accordingly, each row of zone 19 will comprise 10 mark positions indicating the digits 0–9 and a mark placed in each row of zone 19 will be indicative of one of the digits therein. Zone 20 is adapted to receive binary coded parameters indicative of the type of information stored in zones 18 and 19 for controlling the encoding thereof. As indicated in FIG. 2, the four-position binary code relied upon in zone 10 comprises three spaces and one mark. Each row of zone 20 identifies the type of information and controls the disposition of the signals derived from the marks present in the associated row of zone 19 and corresponding signals derived from zone 18 which are not to be processed.

Zone 21 is adapted to receive information of the yes-no, true-false or any other form of one of two alternative types of information. Zone 22 is adapted to receive binary coded parameters indicative of the information stored in zone 21 to thereby control the encoding of the information entered therein. The four mark position binary code relied upon in zone 22, as shown in FIG. 2, here takes the form of two marks and two spaces and is selected so that the yes-no type of information present in zone 21 is read in terms of an output composed for five six-bit characters.

Zone 23 is adapted to receive numerical information and may thus take the same form as zones 14 and 19 described above. Zone 24 is adapted to receive yes-no information or any other one of two alternative forms of information and thus may be similar in form to zone 21 described above. Zone 25 is adapted to receive binary coded parameters indicative of the type of information stored in zones 23 and 24 to thereby control the encoding process to which the electrical signals derived from the information present in these zones is subjected. The four mark position binary code relied upon in zone 25, as shown in FIG. 2, comprises two marks and two spaces.

To illustrate an exemplary use for the mark-sensed document in FIG. 2, a test answer sheet may be considered. Under these conditions, zones 14 and 15 plus 16 could be used to enter a student's seat number and his name in "kana" characters, respectively, while zone 19 was used to indicate the student's date of birth. Zones 21 and 24 could be used to enter a student's answers to yes-no, true-false or questions requiring a similar alternative form of answer and zone 23 could be utilized for the answers to questions requiring a numerical solution. Finally, zone 18 could be relied upon for the student's name in handwritten Chinese characters or his signature.

Figure 3:
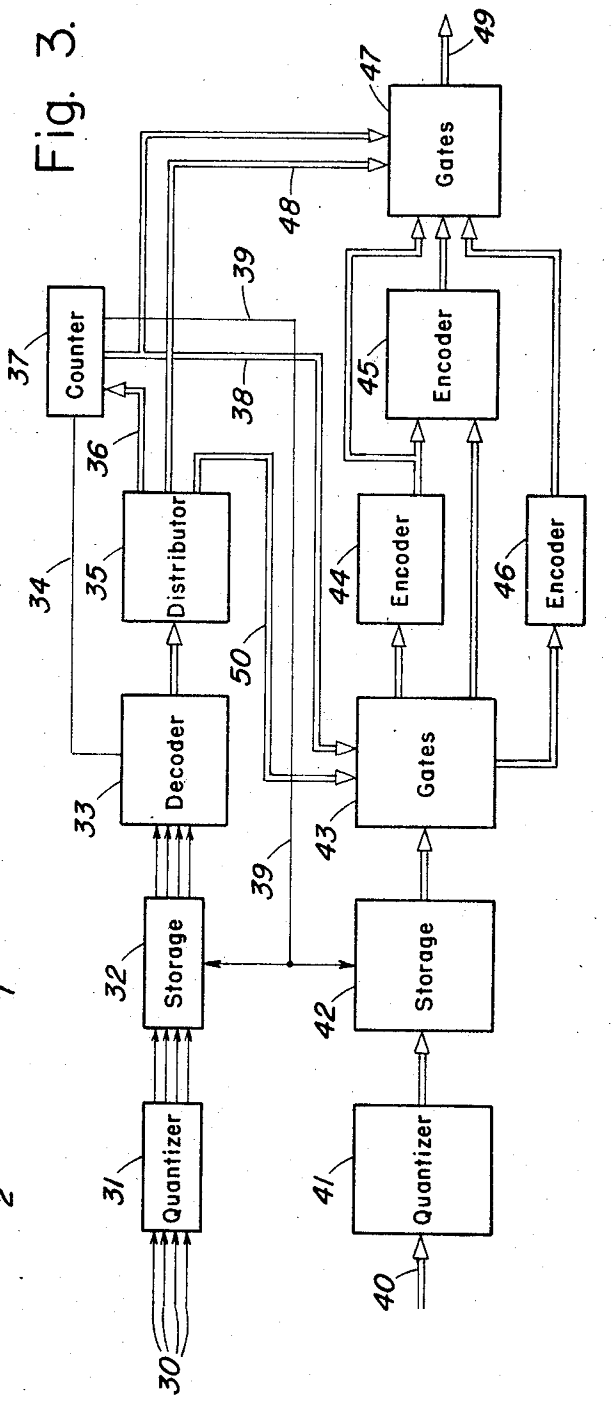
FIG. 3 is a block diagram schematically illustrating the logical processing portion of the recognition apparatus according to the present invention.

Referring now to FIG. 3, there is shown a block diagram schematically illustrating the logical processing portion of the recognition apparatus according to the present invention. The logical processing portion of the recognition apparatus shown in FIG. 3 comprises first and second quantizer means 31 and 41, first and second storage means 32 and 42, decoder means 33, distribution panel means 35, counter means 37, first and second gating means 43 and 47 and first, second and third encoder means 44–46. The first quantizer means 31 may take the form of a conventional quantizing circuit which acts in the well-known manner to amplify and measure the magnitude of input pulses applied thereto and produce therefrom discrete pulses representing 1's or 0's depending on whether or not such input signals derive from a mark position having a mark therein or a mark position which has not been marked. The first quantizer means 31 is connected at four individual inputs thereto to the input conductors 30 while the four outputs thereof are individually applied to the first storage means 32. The input conductors 30, connected to the inputs of the first quantizer means 31, are present within the output cable means 7, shown in FIG. 1, and are connected therein to the outputs of four transducer means 6 which receive reflected, modulated radiation from the four mark positions on the mark-sensed document 10 which are devoted to receiving the binary coded parameter. Therefore, it will be appreciated, that each of the four conductors 30 receives electrical signals derived from the four mark positions within each row of the mark-sensed document present the zones 17, 20, 22 or 25. Thus, the electrical signals applied to the first quantizer means 31 represents the type of information marks present within the row of mark positions associated therewith but are not representative of information to be processed.

Figure 5:
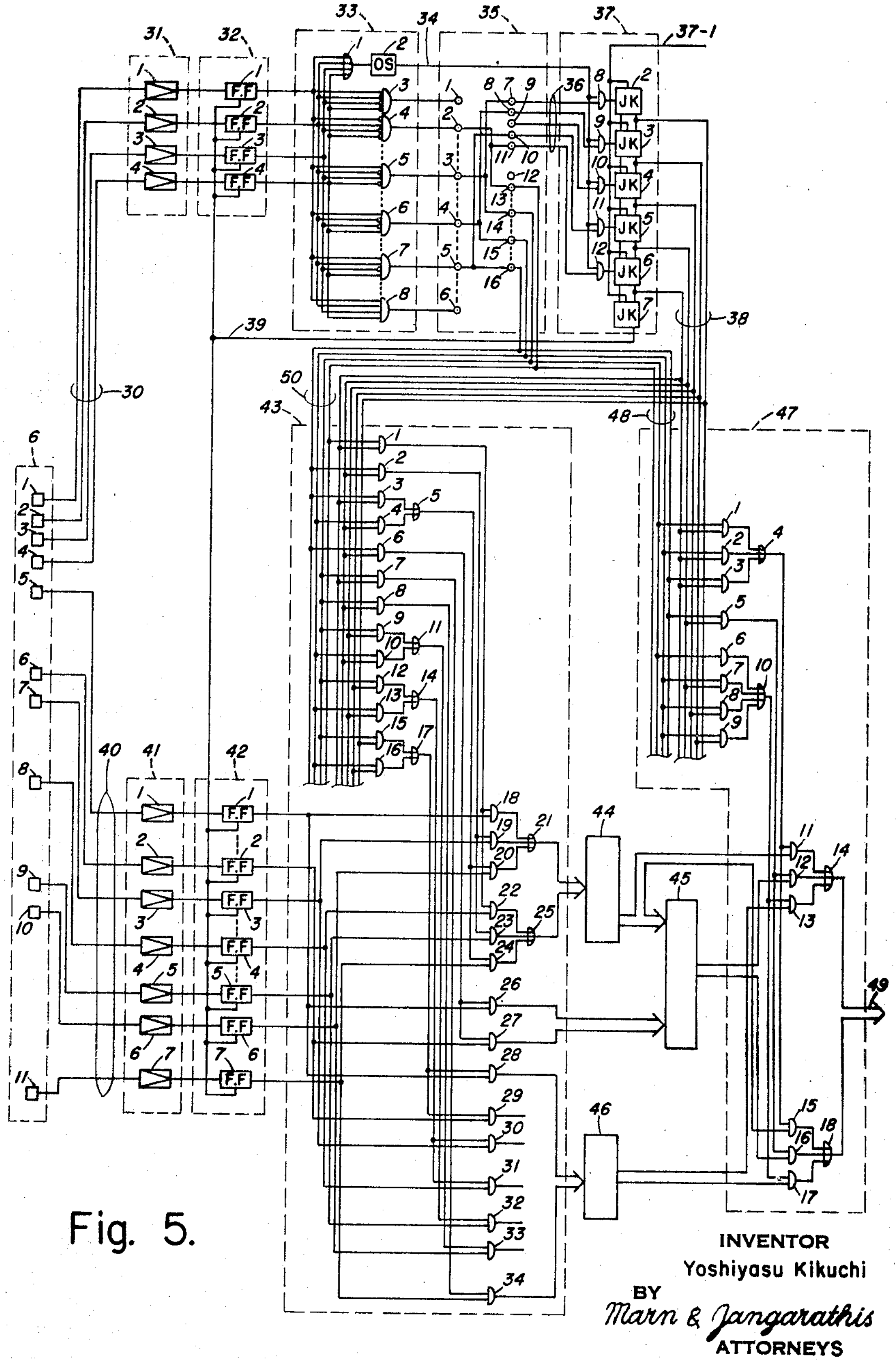
FIG. 5 is a partial logic diagram illustrating an exemplary embodiment of some of the blocks of FIG. 3.

The first storage means 32, which is connected to the outputs of the first quantizer means 31, as aforesaid, may comprise four flip-flops or other conventional binary storage means capable of individually storing the four binary inputs applied thereto, by the first quantizer means 31. FIG. 5 illustrates first storage means 32 as including four flip-flops 32–1, 32–2, 32–3 and 32–4. The first storage means 32 has four individual outputs which correspond respectively to each of the binary inputs supplied thereto and stored therein in the form of 1's and 0's. Each output of the first storage means 32 is connected through the conductors illustrated in FIGS. 3 and 5 to one of the four corresponding inputs of the decoder means 33. The decoder means 33 may take the form of a diode matrix or any other conventional form of decoder means which responds to a four-bit binary code applied in parallel thereto to produce a predetermined information signal output for each of the designated four-bit binary codes received. FIG. 5 indicates that decoder means 33 includes a plurality of AND-gates 33–3 . . . 33–8 having selected input terminals thereof provided with inverting circuits such that each AND gate responds to a unique four-bit binary code applied thereto to produce a binary 1. Each input terminal of each AND gate is coupled to a corresponding flip-flop 32–1 . . . 32–4 included in storage means 32. Decoder means 33 further includes an OR-gate 33–1 having each input terminal thereof coupled to a flip-flop 32–1 . . . 32–4 and an output terminal coupled to one-shot multivibrator 33–2 for a purpose soon to become apparent. This information signal output is applied through the cable illustrated to the distribution panel means 35. In addition, the decoder means 33 upon receipt of at least one binary 1 signal from the first storage means 32, indicating that there is at least one mark in one of the four binary coded parameter mark positions on the mark-sensed document, will apply a signal to the output thereof connected to counter means 37 through conductor 34. The distribution panel means 35 may comprise a connection board or other conventional means having a plurality of patching cords or jumper connections associated therewith so that the information signal output representing the decoded binary coded parameter applied thereto by one of AND-gates 33–3 . . . 33–8 may be distributed in the manner described below, or alternately, to other circuits, not shown herein, when mark-sensed documents adapted for different types of information from that associated with the document shown in FIG. 2 are used. As shown in FIGS. 3 and 5, the input supplied to the distribution panel means 35 is distributed to the counter means 37 through the cable 36 and to the first and second gating means 43 and 47 through the cables 50 and 48, respectively. The counter means 37 may take the form of a conventional binary counter which acts in the well-known manner to count the input signals applied thereto and produce an output signal on conductor 38 for each two input signals received. Counter means 37 is illustratively represented in FIG. 5 as a plurality of conventional J-K flip-flops 37–2 . . . 37–7 arranged in shift register configuration. Each of the J-K flip-flops is adapted to be selectively set to its 1 state in response to a signal supplied thereto by an associated one of gates 37–8 . . . 37–12. In addition, the gates 37–8 . . . 37–12 of counter means 37 receive information signal outputs on the conductor 36 indicative of the number of output signals to be produced thereby from input signals derived from the readout of a given binary coded parameter so that a selected flip-flop is set and upon the production of such number of output signals, a reset pulse may be produced thereby and applied to the conductor 39. The conductor 39 is connected to the clearing inputs of each of the flip-flops included in the first and second storage means 32 and 42 so that upon the production of a reset pulse each of said first and second storage means 32 and 42 is cleared or reset and hence is placed in a condition to receive new information to be stored. As shall be seen below, the counter means 37 acts to count the number of signals applied thereto over lead 37–1 in response to the content of the binary coded parameter and for completing, on developing a prescribed number of outputs, corresponding information signal outputs.

The second quantizer means 41 may take the same form as the first quantizer means 31 described above; however, rather than being designed to accept only four discrete inputs as was the first quantizer means 31, the second quantizer means is designed to accept electrical signals derived from each mark position in a row other than the four mark positions occupied by the binary coded parameter. Thus, if the first row of the mark-sensed document 10 illustrated in FIG. 2 is considered, it will be appreciated that the second quantizer means 41 is adapted to receive, amplify and quantize into 1's and 0's electrical signals derived from the mark positions 12–13. The input to the second quantizer means 41 is applied from the cable 40 which contains each conductor in output cable means 7, shown in FIG. 1, except the four conductors 30 connected to the first quantizer means 31. The second quantizer means 41 has an output corresponding to each input thereto and each output thereof is connected through the cable illustrated in FIG. 3 to corresponding inputs of the second storage means 42. The second storage means 42 may take the same form as the first storage means 32 but here includes one storage facility for each of the parallel inputs applied thereto from the second quantizer means 41. Accordingly, it will be seen that the second storage means 42 will include one flip-flop device illustrated in FIG. 5 as 42–1 . . . 42–7, or other appropriate storage device for each of the mark positions 12-13 shown in FIG. 2. The outputs of each of the storage devices present in the second storage means 42 are connected in parallel, through the cable shown, to corresponding inputs of the first gating means 43.

The first gating means 43 may take the form of a plurality of AND gates and a plurality of OR gates arranged in a switching configuration such as that illustrated in FIG. 5 whereby each input applied thereto from the second storage means 42 may be selectively applied to one of three outputs depending upon the switching signals applied to said first gating means 43. The switching signals applied to said first gating means 43 are applied to gates 43–1 . . . 43–17 through the cables 50 and 38. The switching signals applied to the first gating means 43 through the cable 50 represent the suitably decoded binary coded parameter derived from the output of the decoder means 33 through the terminals 35–13 . . . 35–16 of distribution panel means 35 and is indicative of which of the inputs to the gates 43–18 . . . 43–34 of first gating means 43 are to be applied to respective ones of the three outputs thereof as defined by the content of the binary coded parameter. The switching signal applied to the gates 43–1 . . . 43–17 of first gating means 43 through the cable 38 comprises timing information representing the sequence of the readout information output. The three outputs of the first gating means 43 are each connected respectively to one of the first, second or third encoder means 44–46.

The first encoder means 44 takes the form of a conventional numerical information encoder which acts in the well-known manner to convert information applied thereto having a prescribed code type into information having a second predetermined code type, such as a binary code. For instance, as will be seen below, the first encoder means 44 is adapted to receive mark information entered into one of 10 mark positions designated 0–9; thus, if it is assumed that the mark position designated 5 has been marked in a given row, the first encoder means 44 will convert this information into the standard binary notation "000101." Thus, it will be seen that the first encoder means 44 may comprise a conventional binary coder composed of a plurality of AND gates and OR gates. Additionally, the first encoder means 44 includes circuitry for designating as incorrect, for instance by a code representing a question mark "?," mark information indicating that more than one of the numerical mark positions 0–9 has been marked while converting information indicating that none of the numerical mark positions 0–9 has been marked into a code designating a "blank" insertion. The output of the first encoder means 44 is connected to a first input of the second encoder means 45 and a first input to the second gating means 47 through the cables shown in FIGS. 3 and 5.

The second encoder means 45 is a character information encoder which here takes the form of conventional circuit means responsive to first and second inputs applied thereto to produce output pulses indicative of the character defined by such first and second inputs. The second encoder means 45 is connected at an input thereto to the second output of the first gating means 43 while the output of such second encoder means 45 is connected to a second input of the second gating means 47. In addition, a second input to the second encoder means 45 is connected to the output of the first encoder means 44. As will be seen below, information from the "kana" column designating mark positions present in zone 15 of the mark sensed document 10 shown in FIG. 2 is applied to the second encoder means 45 by the first encoder means 44 during one time interval and information from the row designating mark positions contained in zone 16 is applied to the second encoder means 45 by the first gating means 43 during the same time interval. Thus, in response to "kana" column and row information, as well as a blank or incorrect entry signal supplied by the first encoder means 44; the second encoder means 45 will translate such information into the respective codes prescribed for the individual "kana" characters. Additionally, the second encoder means 45 includes circuitry for developing a code indicative of an "incorrect" entry whenever the presence of more than one mark in a mark position of zones 15 and/or 16 is detected or whenever there is an absence of mark information in either zone 15 or 16, but not in both. Furthermore, when no mark information is detected in each of zones 15 and 16, the second encoder means 45 is capable of developing a "blank" output code for appropriately indicating this condition.

The third encoder means 46 takes the form of conventional circuitry for converting mark information indicative of one of two alternatives into prescribed codes therefor which are acceptable as standard inputs to data-processing equipment. The third encoder means 46 is connected to the third output of the first gating means 43 which serves as an input thereto and to the third input of the second gating means 47 at the output thereof. The second gating means 47 may take the form of a plurality of AND and OR gates arranged in a conventional switching configuration such as that illustrated in FIG. 5 whereby one of three inputs thereto may be selectively gated to the single output thereof in response to the switching signals applied thereto. The gates 47–1 . . . 47–10 of second gating means 47 receive switching signals from the cables 48 and 38 and hence are in receipt of the same switching information as was the first gating means 43. The output of the second gating means 47 is connected to the cable 49 which serves as the output for the recognition apparatus according to the present invention and hence may be connected to data-processing or other utilization equipment not shown herein.

In the operation of the logical processing portion of the recognition apparatus according to the present invention, as shown in FIG. 2, it will be appreciated that as each row of the mark-sensed document is simultaneously read by the optical head 2, shown in FIG. 1, electrical signals derived from the four mark positions reserved for the binary coded parameter will be applied to the four conductors 30 while electrical signals derived from mark positions representing various types of recorded information will be applied in parallel to the plurality of conductors present in the cable 40. Thus, if it is assumed that the top row of the mark-sensed document shown in FIG. 2 is being read during a given time interval, electrical signals derived from the four binary coded parameter mark positions 11 will be applied to the conductors 30 while electrical signals derived from the information mark position 12-13 will be applied in parallel to the various conductors in cable 40. The electrical signals present on each of the four conductors 30 are applied thereby to the first quantizer means 31 which acts in the well-known manner to amplify each of these signals and quantize them in such a manner that signals derived from a mark position having a mark therein have a 1 level associated therewith while electrical signals derived from an unmarked position have a 0 level associated therewith. The four inputs to the first quantizer means 31 thus appropriately quantized into (1's) and (0's) are applied by the first quantizer means 31 to the first storage means 32 as parallel inputs thereto. As the first storage means 32 includes a binary storage device such as a flip-flop for each of the four parallel inputs thereto, the electrical signals applied thereto by the first quantizer means 31 are individually stored therein as binary 1's or 0's. The output of each binary storage device present in the first storage means 32 is applied in parallel to the AND-gates 33–3 . . . 33–8 of decoder means 33 so that each of the four inputs thereto is in receipt of a 1 or 0 input signal and the four inputs applied to said decoder means 33 constitute a four-bit binary code representative of the binary parameter present in each row of zones 17, 20, 22 or 25 of the mark-sensed document 10 shown in FIG. 2.

Upon receipt of at least one binary 1 input, which indicates that there is at least one mark in the four mark positions reserved for the binary coded parameter, a signal is produced by the OR-gate 33–1 to activate the one-shot multivibrator 33–2 of decoder means 33 which applies a pulse to the output thereof connected to the conductor 34 and hence to the input of the gates 37–8 . . . 37–12 of counter means 37. Additionally, the decoder means 33 acts in the well-known manner to decode the four-bit binary code applied to the inputs thereof to produce information signals representative of the content of the binary coded parameter. These information signals are applied from the decoder means 33 to the terminals 35–7 . . . 35–11 of distribution panel means 35 for distribution to the counter means 37 through the cable 36 and to terminals 35–13 . . . 35–16 for distribution to the first and second gating means 43 and 47 through the cables 50 and 48, respectively. It will be appreciated that the binary coded parameters illustrated in zones 17, 20, 22 and 25 of FIG. 2 will be decoded by AND-gates 33–7, 33–4, 33–5 and 33–6, respectively, in view of the unique connections of inverting means at the inputs to these AND gates.

The counter means 37, as aforesaid, may take the form of a conventional binary counter which acts to count the number of signal pulses applied thereto in response to the content of the binary coded parameter and for completing, upon the development of a prescribed number of outputs, the corresponding information signal outputs. The information signals indicating the number of information signal outputs are developed by the decoder means 33 and applied therefrom to the counter means 37 through the distribution panel means 35 and the cable 36. The number of information signals selected for each of the binary coded parameters indicated in zone 17 will correspond to a two-character output wherein one character is for the numerical information in zone 14 and one character is for the "kana" character information in zones 15 and 16. Thus, the binary coded parameter in zone 17 is decoded by AND-gate 33–7 which applies a binary 1 to gate 37–11 via terminals 35–5 and 35–10 and cable 36. When one-shot multivibrator 33–2 is activated, gate 37–11 applies a binary 1 to flip-flop 37–5. Counter means 37 thus provides a binary 1 at the output terminal of flip-flop 37–5. This binary 1 is shifted into flip-flop 37–6 when a pulse is applied to lead 37–1 and then to flip-flop 37–7 in response to the next pulse applied to lead 37–1. Hence, counter means 37 is effective to count down from 2 to zero, which count is applied to cable 38. The number of information signals prescribed for each of the binary coded parameters indicated in zone 20, associated with the numerical information output from zone 19 and no output from zone 18, corresponds to one character wherein AND-gate 33–4 activates gate 37–12 via terminals 35–2, 35–11 and cable 36. When one-shot multivibrator 33–2 is activated, the gate 37–12 applies a binary 1 to flip-flop 37–6 which enables the counter 37 to count down from 1 to zero upon the application of pulses to lead 37–1. It should now be appreciated that each of the binary coded parameters in zone 22 corresponds to five characters wherein the yes-no or true-false information in zone 21 is read out in terms of five, six bit characters. Hence, AND-gate 33–5 activates gate 37–8 via terminals 35–3, 35–7 and cable 36, whereupon flip-flop 37–2 is set when one-shot multivibrator 33–2 is actuated. Counter 37 is thus effective to count from 5 to zero as the binary 1 stored in flip-flop 37–2 is sequentially shifted through flip-flops 37–3 . . . 37–7 in response to pulses sequentially applied to lead 37–1. For zone 25, the number of information signals selected for each of the binary coded parameters indicated therein corresponds to five characters wherein the first character is for the numerical information in zone 23 while the one of two alternative forms of information in zone 24 is read out in terms of six mark positions for the second through fifth characters. Accordingly, the counter means 37 will count the number of signal pulses applied thereto via lead 37–1 in response to the content of the binary coded parameter which is decoded by AND-gate 33–6 and effective to set flip-flop 37–3 to its 1 state, and develop therefrom information signal outputs which are applied to the output thereof connected to the cable 38. These information signal outputs, as shall be seen below, are utilized as switching inputs to the first and second gating means 43 and 47. As soon as the information signal outputs developed by the counter means 37 becomes equal to that designated by the information signal applied to the cable 36 from the decoded means 33 and the distribution panel means 35, the binary 1 originally set into one of flip-flops 37–2 . . . 37–6 is shifted into flip-flop 37–7 whereby the operation of the counter is suspended and at the same time, a reset signal is produced thereby and applied to conductor 39 to reset the flip-flops 32–1 . . . 32–4 and 42–1 . . . 42–7 included in first and second storage means 32 and 42 so that information from the reading of the next row of the mark-sensed document may be received and stored.

While electrical signals derived from the four mark positions devoted to the binary coded parameter in a given row of the mark-sensed document 10 are being applied in parallel to the conductor 30, electrical signals derived from the mark positions dedicated to the storage of information in that row are applied in parallel to the conductors present in the cable 40. These information electrical signals are applied by the cable 40 as parallel inputs to the second quantizer means 41. The second quantizer means 41 acts in the same manner as the first quantizer means 31 to suitably amplify each input signal applied in parallel thereto and quantize each of said input signals as a binary 1 if they derive from a mark position having a mark therein or as a 0 when they correspond to a mark position not having a mark therein. The suitably quantized electrical signals representing each of the information bearing mark positions in a given row are applied in parallel to the second storage means 42. As the second storage means 42 includes a flip-flop circuit means or another form of suitable binary storage device for each of the inputs applied thereto, each of the suitably quantized electrical signals is stored therein and further applied thereby in parallel to the inputs of the first gating means 43 through the cable indicated in FIGS. 3 and 5.

The first gating means 43, as aforesaid, acts to selectively gate each of the inputs applied thereto in parallel from the second storage means 42 to one of three outputs depending upon the switching signals applied thereto. More particularly, the first gating means 43 selectively applies appropriate ones of the quantized information electrical signals received at the inputs thereto to the requisite outputs thereof so that such quantized information electrical signals may be suitably encoded by one of the first, second or third encoder means 44–46 adapted to receive the type of information represented thereby. The switching signals applied to the first gating means 43 comprise information signals in the form of the decoded binary parameter derived from the output of the decoder means 33 and applied to a first switching input of the first gating means 43 from the terminals 35–13 . . . 35–16 of distribution panel 35 through the cable 50 and information outputs applied to a second switching input thereof from the flip-flops 37–2 . . . 37–6 of counter means 37 through the cable 38. As the first gating means 43 takes the form of a plurality of AND gates and a plurality of OR gates, as aforesaid, it will be readily appreciated that the switching operations of the first gating means 43 are controlled, i.e., the gated paths are established, by the information signals applied to the first switching input thereof by the cable 50, while the switching or gating sequence with which quantized information signals from the individual inputs thereto are applied to the requisite ones of the three outputs thereof is controlled by the information signal outputs applied to the second switching input of said first gating means by the counter 37 and the cable 38. Thus, the decoded information signals derived from the coded binary parameter control the disposition among three outputs of the various types of quantized information signals applied as inputs to the first gating means 43, while the sequence of the application thereof is controlled by the counter means 37. This may be more clearly understood if the operation of the first gating means 43 is considered in light of the mark-sensed document illustrated in FIG. 2. For instance, if it is assumed that a row of the mark-sensed document 10 is being read which is associated with parallel zones 14–17, the quantized electrical signals derived from a row in zone 14 and applied to the input of the first gating means 43 will be applied to the output of the first gating means 43 connected to the first encoder means 44 for the first character output of the counter means 37 while mark information from corresponding row mark positions of zones 15 and 16 will be applied to the outputs of the first gating means 43 connected to the first and second encoder means 44 and 45, respectively, as the second character output timed by the counter means 37. Similarly, if a row of the mark-sensed document 10 is being read which corresponds to a row included in zones 19 and 20, the quantized information signals derived from zone 19 will be applied by the first gating means 43 to the output thereof connected to the first encoder means 44 as the single character output timed by the counter means 37. If a row residing within zones 21 and 22 on the mark-sensed document 10 is now considered, the quantized mark information signals associated with the zone 21 will be applied by the first gating means 43 to the output thereof connected to the third encoder means 46 as a series of five, six bit characters whose timing is controlled by the counter means 37. Finally, if a row residing within zones 23–25 is considered as being read, the quantized mark information signals associated with zone 23 will be applied by the first gating means 43 to the output thereof connected to the first encoder means 44 as a first character while the quantized mark information signals associated with zone 24 are applied to the output of the first gating means 43 connected to the third encoder means 46 for the second through fifth characters. Therefore, it will be appreciated that the first gating means 43 receives quantized information signal inputs representative of the mark information recorded in a given row of the mark-sensed document 10 and selectively gates such inputs to the three outputs thereof in response to the content of the binary coded parameter associated with that row wherein the gating paths established in said first gating means 43 are established under the control of the information signals applied from the decoder means 33 to the first switching input thereto through cable 50 and the sequence of application of such inputs to the three outputs thereof is controlled by the information signal outputs applied to the second switching input thereof by the counter means 37 through cable 38.

The first encoder means 44 is connected, as aforesaid, to one of the outputs of the first gating means 43 and is adapted to transform the quantized numerical information signals derived from the respective rows of zones 14, 19 and 23 into pulses representing standard binary notation to the base 2. In addition, as was also mentioned above, the first encoder means 44 includes circuitry for indicating an incorrect entry when more than one mark position of a row in the numerical information zones 14, 19 and 23 has been marked while a blank condition is indicated by said first encoder means 44 when no marks are present in a given row of the information zones 14, 19 and 23. Accordingly, when a row present in each of the zones 14–17 of the mark-sensed document 10 is read by the recognition apparatus according to the present invention and correctly entered information signals derived from zone 14 are applied to the first encoder means 44 by the first gating means 43 for the first character, the first encoder means 44 will transform such row information signals derived from zone 14 into an electrical pulse train representative of standard binary notation and apply such pulse train to a first input of the second gating means 47 and to an input of the second encoder means 45. However, during the second character interval of the reading of a row common to the zones 14–17 of the mark-sensed document 10, information signals from zone 15 will be applied by the first gating means 43 to the first encoder means 44 and hence the output from the first encoder means 44 which is applied to the first input of the second gating means 47 and to an input to the second encoder means 45 will comprise a "kana" column designating signal as well as an incorrect entry indicating signal. Similarly, when a row on the mark-sensed document is read which is included in zones 18–20, numerical mark indicating signals will be applied to the first encoder means 44 only during the single character interval mentioned above and hence during any other interval related to the reading of such row the output applied from the first encoder means 44 to the first input of the second gating means 47 and the input of the second encoder means 45 is indicative of either a blank or possibly an incorrect entry. In a like manner, when a row on the mark-sensed document 10 included in zones 23–25 is read by the recognition apparatus according to the present invention, information signals derived from numerical information zone 23 will be applied to the first encoder means 44 during a first character interval associated with the reading of this row; however, during the second through the fifth character intervals blank entry or incorrect entry indicating signals will be present at the output of the first encoder means 44 and applied to the first input of the second gating means 47 and the input to the second encoder means 45. Therefore, it will be appreciated that the first encoder means transforms mark information derived from the mark-sensed document 10 into standard binary number indicating pulses and applies such pulses to the first input of the second gating means 47 during prescribed time intervals controlled by the counter 37. At all other time intervals, however, the output of the first encoder means 44 is indicative of a blank or incorrect entry condition.

The second encoder means 45 is connected to another output of the first gating means 43 while another input thereto is connected to the output of the first encoder means 44. When a row of the mark-sensed document 10 shown in FIG. 2 included in zones 14–17 is read by the recognition apparatus according to the present invention, numerical signals, if any, derived from the portion of the row contained in zone 14 will be applied to the first encoder means 44 during the first character interval, as stated above and hence the output of the first encoder means 44 applied to one input of the second encoder means 45 during this interval will comprise either a pulse train indicative of either a binary numeral or a blank condition. During the second character interval, however, the first encoder means 44 receives "kana" column designating signals derived from zone 15 which column designating signals may comprise the second application of information signals to the first encoder means 44. Thus, the output of the first encoder means 44 which is applied to one input of the second encoder means 45 during the second character interval will include both "kana" column designating information signals and a signal indicating a blank or incorrect entry condition. In addition, during such second character interval of the reading of this row, the first gating means 43, as aforesaid, applies "-kana" row information signals derived from zone 16 to another input of the second encoder means 45. Thus, the second encoder means 45 is in receipt of "kana" column designating information signals and either a blank or incorrect entry condition signal at one input thereto and in receipt of "-kana" row designating information signals at a second input thereto. Accordingly, as the second encoder means 45 acts in the well-known manner to translate these signals into prescribed codes for individual "kana" characters, the output of the second encoder means as applied to the second input of the second gating means 47 will represent, under these conditions, a prescribed code for an individual "kana" character during the second character interval when a row included in zones 14–17 of the mark-sensed document 10 is read. Furthermore, as the second encoder means 45 includes circuitry, as aforesaid, for developing a code indicative of an incorrect entry when two or more mark positions in a row in zones 15 or 16 have been marked or in the absence of mark information in one of the zones 15 or 16, and a code indicating a blank entry when none of the mark positions in a row in zones 15 and 16 has been marked; the output of the second encoder means 45 as applied to the second input of the second gating means 47 will be a code indicative of an incorrect or blank entry when conditions are other than specified above for the production of a prescribed "kana" character code.

The third encoder means 46 is connected, as aforesaid, to the third output of the first gating means 43 and receives therefrom information signals indicative of one of two alternatives as derived from zones 21 and 24 of the mark-sensed document 10 shown in FIG. 2. The third encoder means 46 acts upon such information signals to transform them into signals representative of codes acceptable by standard data-processing equipment and applies these signals to the third input to the second gating means 47. Accordingly, it will be seen that when any row on the mark-sensed document 10 included in zones 21 and 22 is read, information signals indicative of one of two alternatives are applied by the first gating means 43 to the third encoder means 46 during each of the five character intervals associated therewith and hence such information signals are transformed into prescribed codes and applied to the third input of the second gating means 47 as five, six bit characters. Similarly, when any row on the mark sensed document 10 included in zones 23–25 is read, information signals indicative of one of two alternatives is applied by the first gating means 43 to the third encoder means 46 during the second through the fifth character intervals associated therewith while information signals representative of numerical information is applied by the first gating means 43 to the first encoder means 44 during the first character interval defined by the counter means 37. Under these conditions, the information signals are transformed into prescribed standard codes by the third encoder means 46 during the second through the fifth character intervals and applied to the third input of the second gating means 43.

As will be appreciated from the operation of the first gating means 43 and the first, second and third encoder means 44–46 set forth above, one or more of the three inputs to the second gating means 47 will be in receipt of each type of information present in any row of the mark-sensed document being read at a given time. Furthermore, as none of the three inputs to the second gating means 47 will comprise the same type of information and since when two more types of information are present at two or more inputs of said second gating means 47 they will be in a predetermined character sequence; the inputs to the second gating means 47 may be selected depending on the content of that row and enable in a sequence which depends on the character order in which they appear. The second gating means 47 is composed of a plurality of AND and OR gates as aforesaid, which are selectively enabled to gate selected ones of the three inputs thereto to the output 49 thereof in response to switching signals applied thereto by the cables 48 and 38. The switching signals applied to the second gating means 47 by the cable 48 are derived from the output of the decoder means 33 via the distribution panel means 35 and act in the same manner explained in regard to the first gating means 43 to selectively establish gating paths through the second gating means 47 in response to the content of the binary coded parameter in each row of the mark-sensed document which is read. The switching signals applied to the second gating means 47 by the cable 38 are derived from the output of the counter means 33 and act, in the same manner as explained with regard to the first gating means 43, to determined the sequence with which the selectively established gating paths through the second gating means 47 are enabled. Accordingly, it will be seen that as each row of a marked sensed document is read by the recognition apparatus according to the present invention, the appropriate inputs to the second gating means 47 will be applied to the output cable 49 in the requisite sequence so that each type of information present in such row will be readout, in a prescribed code, in a time division sequence.

The operation of the apparatus illustrated in FIGS. 3 and 5 will now be described for the typical example wherein a row of mark positions residing in zones 14–17 is sensed by transducer means 6. The four mark positions in zone 17 represent a binary coded parameter that is decoded by AND-gate 33–7 to produce an information signal effective to set flip-flop 37–5 to its 1 state, whereby counter means 37 may count from 2 to zero. The information signal produced by AND-gate 33–7 is additionally applied via terminals 35–5, 35–16 and cables 50 and 48 to the input terminals of AND-gates 43–2, 43–3 and 43–6 and to the input terminals of AND-gates 47–3 and 47–5, respectively. The binary 1 stored by flip-flop 37–5 is applied via cable 38 to the input terminals of AND-gates 43–2, 43–6, 43–8 and 43–10 and to the input terminals of AND-gates 47–5 and 47–7. It is appreciated, therefore, that AND-gates 43–2 and 43–6 are activated to produce a binary 1 since both input terminals of said AND gates are supplied with binary 1's, and AND-gate 47–5 is activated to produce a binary 1. The binary 1 produced by AND-gate 43–6 is applied to AND-gates 43–26 and 43–27, thereby enabling the latter AND gates to transmit the binary signals applied to the other input terminals thereof. It is observed that AND-gates 43–26 and 43–27 are supplied with the signals stored in flip-flops 42–1 and 42–2, respectively. These signals are derived from the mark positions included in zone 16 and represent "kana" information. This "kana" information is, therefore, applied to the second encoder means 45 by the activated AND-gates 43–26 and 43–27.

The binary 1 produced by AND-gate 43–2 is applied to AND-gates 43–19 and 43–23, thereby enabling the latter AND gates to transmit the binary signals applied to the other input terminals thereof. AND-gates 43–19 and 43–23 are supplied with signals stored in flip-flops 42–3 and 42–5, respectively. These signals are derived from the mark positions included in zone 15 and represent "kana" information. The "-kana" information is applied to the first encoder means 44 via OR-gates 43–21 and 43–25. It is recalled that encoder means 44 produces a four-bit binary code in response to the "kana" information derived from zone 15 and supplied thereto. The encoded signals are applied to encoder means 45 in parallel form whereat they are combined with the five-bit binary code produced in response to the "kana" information derived from zone 16 and applied by AND-gates 43–26 and 43–27 to encoder means 45. The resultant signal produced by encoder means 45 is a seven-bit binary code which represents one character of "kana" information. This encoded signal is applied to AND-gates 47–12 and 47–16. Previously activated AND-gate 47–5 supplies a binary 1 to each of AND-gates 47–12 and 47–16, thereby enabling the encoded signal applied to the latter AND gates to be transmitted to cable 49 via OR-gates 47–14 and 47–18, respectively. The encoded signal may then be applied to utilization equipment, not shown, coupled to cable 49.

A pulse applied to lead 37–1, which pulse may signify the reception of the encoded signal by the utilization equipment, is effective to shift the binary 1 stored in flip-flop 37–5 into flip-flop 37–6, thereby decrementing the count of counter means from 2 to 1. Consequently, AND-gates 43–2 and 43–6 as well as AND-gate 47–5 are deactivated. It is observed, however, that AND-gate 43–3 is now activated because a first input terminal thereof is supplied with a binary 1 by AND-gate 33–7 and a second input terminal thereof is supplied with a binary 1 by flip-flop 37–6. Likewise, AND-gate 47–3 is also activated. The output of AND-gate 43–3 is applied to AND-gates 43–20 and 43–24, thereby enabling the latter AND gates to transmit the binary signals applied to the other input terminals thereof. AND-gates 43–20 and 43–24 are supplied with signals stored in flip-flops 42–6 and 42–7, respectively. These signals are derived from the mark positions included in zone 14 and represent "numerical" information. The "numerical" information is applied to the first encoder means 44 via OR-gates 43–21 and 43–25. It is recalled that encoder means 44 produces a four-bit binary code in response to the "numerical" information derived from zone 14 and supplied thereto. The encoded signal is applied to AND-gates 47–11 and 47–15, and then to cable 49 via OR-gates 47–14 and 47–18.

A pulse applied to lead 37–1, signifying the reception of the encoded signal by utilization equipment coupled to cable 49, results in the shifting of the binary 1 from flip-flop 37–6 to flip-flop 37–7, thereby reducing the count of counter means 37 from 1 to zero. A binary 1 stored by flip-flop 37–7 is supplied to conductor 39 and is effective to reset the contents of flip-flops 32–1 . . . 32–4 and 42–1 . . . 42–7. Accordingly, the recognition apparatus illustrated herein is now in preparation for reading subsequent information sensed by transducer means 6 and marked in a succeeding row. It is appreciated that if the binary coded parameter sensed by transducer means 6–1 . . . 6–4 corresponds to the binary coded parameter derived from the mark positions within zone 17, the illustrated apparatus operates as aforedescribed. However, if the sensed binary coded parameter corresponds to the mark positions within zones 20, 22 or 25, the marks sensed by transducer means 6–5 . . . 6–11 are selectively encoded and read out in a proper sequence in accordance with the decoded parameter.

Although the present invention has been disclosed in conjunction with the mark-sensed document illustrated in FIG. 2 and encoder means appropriate for acting in response to the types of information present thereon, it will be obvious to those of ordinary skill in the art, that any type of information may be read according to the principles of the present invention and that the encoder means relied upon need only be appropriate for such type of information. Furthermore, although a specific mark-sensed document format was disclosed in FIG. 2 for the purposes of the explanation of the present invention, it will be fully appreciated that any mark-sensed document format may be read with the recognition apparatus according to the present invention. Additionally, although the present invention has been disclosed in conjunction with mark-sensed documents, it will be appreciated that the principles of the present invention are fully applicable to any document sensed in any manner.

Therefore, it is manifest that this invention is not limited to what is specifically shown herein.

What is claimed is:

1. Recognition apparatus for converting marks representing various types of information present on a document into coded electrical binary signals, said marks being arranged in rows and columns and wherein the codes represented by said coded electrical binary signals are associated with said types of information, comprising:

a plurality of transducer means arranged to simultaneously sense each mark and other data representing indicia in a row on said document and for producing at outputs of a predetermined number of said plurality of transducer means a predetermined number of electrical signals forming a binary code, said binary code serving to identify the types of information contained in the remainder of said row;

means for causing relative motion between said document and said plurality of transducer means so that said plurality of transducer means are placed in a sensing relationship with portions of said document;

means responsive to outputs of said predetermined number of transducer means for detecting the type of information represented by the marks sensed by others of said transducer means, said responsive means including decoder means for decoding said binary code into prescribed information signals and including counter means responsive to said electrical signals forming said binary code to produce a predetermined number of output pulses in response thereto;

means for selectively gating electrical signals from the outputs of said others of said transducer means to a plurality of output means in response to switching signals, each of said output means including encoder means for transforming said electrical signals selectively gated thereto into a preselected binary signal; and means for applying said information signals from said decoder means and said output pulses from said counter means to said means for selectively gating as switching signals therefor.

2. The recognition apparatus according to claim 1 additionally comprising means for applying said pulses produced by said counter means to said gating means as other switching signals therefor.

3. The recognition apparatus according to claim 2 additionally comprising:

gate means for selectively applying said preselected binary signal produced by each of said encoder means to output means for said recognition apparatus in response to switching signals applied thereto;

means for applying information signals from said decoder means to said gate means as switching signals therefor; and means for applying said pulses produced by said counter means to said gate means as other switching signals therefor, said information signals from said decoder means acting to establish predetermined switch paths in said gating means and said gate means and said pulses produced by said counter means acting to control sequence with which said established predetermined switch paths in said gating and gate means are enabled.

4. The recognition apparatus according to claim 3 wherein said plurality of transducer means are present in an optical head adapted to scan said document.

5. The recognition apparatus according to claim 4 wherein said electrical signals produced by said plurality of transducer means are quantized as 1's and 0's.

* * * * *